Feb. 13, 1968  E. P. WEAVER  3,368,670
METHOD OF INCREASING SHELF LIFE OF HYDRATABLE
REFRACTORY AND PRODUCT THEREFOR
Filed Oct. 13, 1966
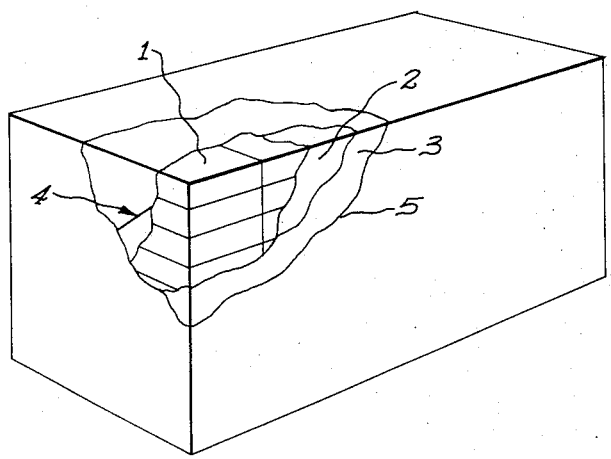
INVENTOR.
ERNEST P. WEAVER
BY
ATTORNEY

United States Patent Office 3,368,670
Patented Feb. 13, 1968

3,368,670
METHOD OF INCREASING SHELF LIFE OF HYDRATABLE REFRACTORY AND PRODUCT THEREFOR
Ernest P. Weaver, Pittsburgh, Pa., assignor to Dresser Industries, Inc., Dallas, Tex., a corporation of Delaware
Filed Oct. 13, 1966, Ser. No. 586,394
9 Claims. (Cl. 206—65)

ABSTRACT OF THE DISCLOSURE

A composite package of multi-component encapsulating means and hydratable refractory shapes; the coating being comprised of a parting agent, a paper wrapping, means sealing the paper wrapping, and a strippable plastic coating exterior thereof; the coating having a water vapor transmission on the order of 0.01 to 0.6 gram of moisture per square meter of surface for 24 hours.

---

This invention relates to refractory products, and more particularly to basic refractory products containing hydratable grains arranged for long shelf life under conditions of high ambient temperature and humidity.

The steel making industry has a fairly recent innovation using oxygen in steel making processes. Some of the processes have been variously designated as the "LD" process, basic oxygen furnace process, oxygen converter process, etc. The lining of the vessels used in the oxygen steel making processes has been typically made of basic refractories, because the slag of the oxygen steel making process is itself basic. The refractory shapes used in making such linings may normally be refractory grains chemically bonded or ceramically bonded into the desired shape. The chemically bonded shapes are green or unfired shapes and are put into service in such form. The ceramically bonded shapes are refractory shapes which have been initially subjected to an elevated burning or firing temperature to obtain a ceramic bond throughout the particulate material from which the shape is fabricated. The chemically bonded shapes utilize particulate refractories bonded together by means of a bonding agent, normally a tar and/or a pitch.

In the preparation of shapes, with a chemical bond, refractory grains are mixed with the tar are pressed into shape. The pressed shapes are then layed-up in position in a vessel, forming the lining of the vessel. On firing of the vessel the refractory grains bond together.

The commonly used basic refractories are dead-burned magnesite, dead-burned dolomite, and sometimes lime mixed with the foregoing. Theoretically, lime alone (CaO) would be desirable because of its high melting point. Lime, however, has a very great tendency to undergo hydration from atmospheric moisture which has precluded its use. Dead-burned dolomite, which is commonly used, also has a pronounced hydration tendency. The present invention is concerned primarily with refractories containing a major percent of dolomite; however, it is not limited to such a concept, but is useful for refractories which have a tendency to hydrate.

As is well known refractory brick are conventionally made as an off the shelf item, that is, a number of shapes are made as general articles of commerce and are not specifically prepared for a specific job. This, of course, means that such shapes may at times be held in a stock shed or warehouse for a substantial period of time prior to shipment for a particular job. Also, after the refractory shapes have been delivered to the location where they will be made into a lining, some period of time may pass before the lining in the vessel is completed and the vessel fired to consolidate the refractory into the lining. During the winter months, where the temperatures are cool and the relative humidity of the atmosphere is relatively low, hydration of refractories does not present too much of a problem. In the warmer weather, however, hydration of the chemically bonded refractory shapes presents a tremendous problem. Particularly in a spell of very hot and very humid weather, storage and delay in making a lining from brick which has been delivered to the site and opened from a package ready for building the lining, may become so hydrated as to become unsable by spalling and crumbling and must be discarded. With the advent of very large oxygen blowing process vessels, the strength of the refractory shapes for the lining becomes very important. It is conventional to utilize unburned shapes of dead-burned dolomite, sometimes mixed with magnesite and often with lime bonded with a pitch or tar to form the molten metal contacting portion of the vessel lining. When one considers the immense weight of the refractory which the lower courses of the lining of the vessel must support, the problem becomes readily apparent and it is seen that partially or wholly hydrated shapes are completely unusable for such purposes. It is, therefore, an object of this present invention to provide a process for packing a pallet of stacked shapes, maintaining the shapes out of contact with moisture and thereby preventing hydration thereof.

Another object of the invention is to provide an economical packaging means for a pallet of stacked shapes, increasing the shelf life of such shapes under conditions of high ambient temperatures and humidity.

According to the present invention there is provided an improved packaging method of maintaining tar-bonded basic refractory shapes stacked in commercial quantities on pallets. A standard pallet is the single deck type 36 by 48 inches with three runners. A typical pallet load amounts to about 4,000 pounds net weight. After the pallets are loaded they are transported either to stock sheds or directly to a shipping vehicle.

The drawing, which is a perspective view of a package according to this invention, has some elements exaggerated and some parts broken away, for purposes of clarity. The package is comprised of brick 1 coated with oil 2 over which is paper material 3 sealed as by folding over the ends 4, and all the foregoing is encapsulated in an envelope 5 of synthetic plastic-like material.

In the tests given below, dolomite or high lime brick were prepared and tested with the several coatings as set out below. The brick are made in accordance with U.S. Patent No. 3,233,017, issued February 1, 1966, entitled "Refractory Procedures" and assigned to the assignee of the present application. As defined in the patent, a tar-bonded basic refractory shape is made from a batch of size graded basic refractory grains and a selected non-aqueous, cokeable, carbonaceous bonding material. One satisfactory mix of refractory grains includes about 60 parts by weight of stabilized dolomite in a coarse range (plus 28 or 35 mesh) and about 40 parts of magnesite in a finer range (minus 28 or minus 35 mesh). The sized refractory grains are prepared for making shapes by mixing with from 5 to 6 parts by weight of either powdered hard pitch or a mixture of powdered hard pitch and medium pitch. All of these materials are intimately mixed and the shapes are formed on a hydraulic press at about 8000 p.s.i. The resulting shapes are dried in a desiccated atmosphere drier or heated to about 350–450° F. for a period of time ranging from 10 or so to about 72 hours, depending upon the temperature.

For the hydration tests various types of papers were used to wrap refractory shapes in the form of rectangular brick. The wrapped brick were placed in a humidity chamber at 90° F. and 80% relative humidity, and the brick were checked, through the wrapping, to ascertain whether or not spalling had occurred during each 24-hour period.

In one test, brick, made in accordance with the above directions, was wrapped with a wrapping which is a composition paper and polyethylene manufactured by Ludlow Corporation, of Massachuetts, and labeled #2507, and taped in place. The water vapor transmission rate of the paper in grams per 100 square inches per 24 hours was 0.15. The brick wrapped in the paper, however, hydrated after six days.

In other tests brick made in accordance to the above was wrapped in various paper and subjected to the hydration chamber as outlined as follows:

TABLE I

| Type of Wrapping | 1 | 2 | 3 | 4 | 5 |
|---|---|---|---|---|---|
| Water Vapor Transmission Rate, gm./100 in. | | | 1.3 | 0.70 | 0.02 |
| Brick Hydrated After (days) | 8 | 14 | 14 | 17 | 22 |

1. Asphalt-paper composition.
2. Polyethylene Film.
3. Asphalt-paper, Amer. Sisalkraft Co., Fibreen #890.
4. Paper-polyethylene, Tri-Pli, Black and White #332.
5. Paper-aluminum foil barrier, Marvellum Co., Marvelseal #3959.

Brick made according to the data given are sprayed with oil, wrapped with a bitumen paper (same as Type No. 1 in Table I), and the entire pallet dipped in a molten mixture of paraffin wax and ethylene-vinyl acetate copolymer. The amount of wax was 50% by weight, but may be from 50–80% of the synthetic resin. On testing, it was found that the brick had not hydrated and no spalling was apparent after 35 days in the humidity chamber.

Various other types of coatings for the paper may be used, to provide what may be termed a "strippable coating." Some other coatings which may be used in place of the above described co-polymer and paraffin include certain resins, polymers, elastomers and the like, used combined with or without a wax, and other resins, also, include alkyd resins (alkyd resins are products of glycerol and phthalic acid or anhydride), mixed polymers of alkyds and acrylics, methacrylates, acrylonitriles, styrene and the like, epoxy resins, unsaturated polyester resins, polyethylenes, polypropylenes, polyvinyl chloride, polyvinylidine chloride and acetates, and the like. The vapor transmission numbers are determined by the "TAPPI" test designated T–488.

It is important that the coating over the paper reduces the vapor transmission of the covering for the brick to a range of from 0.01 to about 0.6 gram of moisture per 100 square inches transmitted per 24 hours. Other waxes may, of course, be used in conjunction with the resins and polymers; however, for economy paraffin wax is preferred. Waxes are esters of higher fatty acids and include beeswax, wool wax, carnauba wax, etc. The resins and the wax must be heated to provide a miscible solution into which the wrapped pallet of brick is dipped. The temperature to which the solution is heated depends on the mixture and it ranges from 200–400° F. The brick should be cooler than the mixture. It is, also, preferable that the brick be relatively cool, since the heated brick would not permit proper setting of the coating on the paper-wrapped pallet of brick. The coated pallet of brick may be placed in stock sheds or moved directly to the vehicle for transporation.

The examples given above are green, unfired brick; however, ceramically bonded and tar-impregnated brick may, also, be treated in a similar manner by wrapping a pallet of such brick in the paper and then dipping the entire pallet in a strippable coating. In each case it is desired to keep the brick out of contact with atmospheric moisture during shipping and storage.

The type of paper for wrapping is preferably of a heavy gauge bitumen-impregnated paper (tar paper) since such paper provides a certain amount of water repellency itself. However, depending upon the type of and thickness of the coating placed on the paper-wrapped pallet, various types of paper may be used. Some such papers include a composite paper and asphalt, paper with an aluminum foil barrier, etc. For economy, however, it is preferred to use the paper and asphalt composite wrapping instead of the more expensive papers such as those with an aluminum barrier.

As pointed out above, the brick on the pallet are sprayed with oil, for example, as S.A.E. 30 oil, to provide a parting agent in the event any of the resin coating penetrates the paper wrapping. The oil acts as a parting agent since it prevents adhesion of the plastic coating to the brick. A small amount of the plastic film sticking to the brick is not detrimental, so long as it does not prevent laying up the brick in the lining. It is, of course, understood that brick must have flat surfaces so that each course in a lining is in face engagement with the adjacent courses. Other parting agents may be higher molecular weight fatty acid derivatives or the fatty acids themselves. Such fatty acids or derivatives as stearic acid, palmitic acid, lauric acid and the like, or salts thereof which include alkali and alkaline earth salts such as sodium, lithium, potassium, calcium, barium and the like, may be used as a parting agent for the brick. Preferably, the fatty acid has at least 8 carbons.

After the coated pallet reaches its destination for use, the coating is slit and peeled off the pallet, and the brick are then exposed and ready for laying up.

Having thus described the invention in detail and with sufficient particularity to enable those skilled in the art to practice it, what is desired to have protected by Letters Patent is set forth in the following claims.

What is claimed is:

1. A package of hydratable refractory shapes arranged for shipment and long term storage comprising (1) a plurality of stacked, hydratable shapes in a regular stack and mounted on a transportation pallet; at least the exposed surfaces of said shapes being covered with (2) a parting agent for a strippable synthetic plastic; (3) a paper wrapping covering said stacked shapes enclosing the same in an enclosed package; (4) means for sealing said wrapping around said stacked shapes, and (5) a strippable plastic coating encasing said package in an air and moistureproof envelope, said envelope of (3) paper wrapping and (5) synthetic plastic being a strippable coating for easy removal from said stacked shapes, said sealed envelope being characterized by having good cohesion and low adhesion on said exposed surfaces of shapes, and said envelope having a low vapor transmission on the order of 0.01 to 0.6 gram of moisture per square meter of surface per 24 hours.

2. A package of refractory shapes according to claim 1 wherein said parting agent is a petroleum oil.

3. A package of refractory shapes according to claim 1 wherein said shapes are formed of a basic refractory and contain a major quantity of hydratable grains.

4. A package of refractory shapes according to claim 3 wherein said paper is a bitumen paper.

5. A package of refractory shapes according to claim 3 wherein said plastic coating is a composition of a synthetic resin and a wax.

6. A package of refractory shapes according to claim 5 wherein said wax is a petroleum wax.

7. A package of refractory shapes according to claim 5 wherein said synthetic resin is a polyvinylidene resin.

8. The method of packaging refractory shapes which contain a major portion of hydratable grains which comprises coating at least the exposed surfaces of a stack of refractory shapes with a parting agent; wrapping said stack of refractory shapes with a paper-type of covering; sealing said paper-type of covering around said stack of refractory shapes; and then coating the entire covered stack with a thin, waterproof and airtight layer of a synthetic plastic.

9. The method according to claim 8 wherein said paper-type covered stack is dipped in a hot liquid synthetic plastic to uniformly coat said package with a strippable coating.

References Cited

UNITED STATES PATENTS

| 1,922,560 | 8/1933 | Sullivan | 206—60 |
| 1,983,590 | 12/1934 | Anderson | 206—46 |
| 2,050,239 | 8/1936 | Albright et al. | 117—6 |

JOSEPH R. LECLAIR, *Primary Examiner.*

THERON E. CONDON, *Examiner.*

J. M. CASKIE, *Assistant Examiner.*